US008867454B2

(12) United States Patent
Vukovic et al.

(10) Patent No.: US 8,867,454 B2
(45) Date of Patent: Oct. 21, 2014

(54) METHOD FOR ALLOCATING NON-DEDICATED RESOURCE AS A DEDICATED RESOURCE

(75) Inventors: Ivan N. Vukovic, Arlington Heights, IL (US); Igor Filipovich, Chicago, IL (US); Rapeepat Ratasuk, Hoffman Estates, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1842 days.

(21) Appl. No.: 12/052,641

(22) Filed: Mar. 20, 2008

(65) Prior Publication Data
US 2009/0238122 A1 Sep. 24, 2009

(51) Int. Cl.
*H04W 4/00* (2009.01)
*H04W 72/04* (2009.01)

(52) U.S. Cl.
CPC ........ *H04W 72/0493* (2013.01); *H04W 72/042* (2013.01)
USPC .......................................................... 370/329

(58) Field of Classification Search
USPC .......................................................... 370/329
See application file for complete search history.

(56) References Cited

U.S. PATENT DOCUMENTS

| 5,673,259 | A  | * | 9/1997  | Quick, Jr. ...................... 370/342 |
| 6,058,307 | A  | * | 5/2000  | Garner .......................... 455/428 |
| 6,785,283 | B1 | * | 8/2004  | Stichter .................... 370/395.42 |
| 2002/0075844 | A1 | * | 6/2002  | Hagen .......................... 370/351 |
| 2003/0236854 | A1 | * | 12/2003 | Rom et al. .................... 709/217 |
| 2006/0212588 | A1 | * | 9/2006  | Haner et al. ................. 709/229 |
| 2009/0042582 | A1 | * | 2/2009  | Wang et al. ................... 455/450 |

FOREIGN PATENT DOCUMENTS

| EP | 0993211 B1 | 1/2005 |
| WO | 2007091841 A1 | 8/2007 |

OTHER PUBLICATIONS

3GPP TSG RAN WG2 #57, Random Access Preamble signatures, usage, R2-070891, Feb. 12-16, St. Louis, USA, Panasonic, pages all.
3GPP TSG RAN2#57, Dedicated Random Access Signatures, R2-070727, St. Louis, USA, Feb. 12-16, 2007, Motorola, pages all.

* cited by examiner

*Primary Examiner* — Noel Beharry
(74) *Attorney, Agent, or Firm* — Faegre Baker Daniels LLP

(57) ABSTRACT

A method of allocating resources and signatures of a random access resource (RACH) (200) that includes dedicated (202) and non-dedicated (204) resources or sub-resources is disclosed. The network device determines if the dedicated resource is available for allocation. If the dedicated resource is available, the network device allocates the dedicated resource. If the dedicated resource is blocked, the network device allocates one of the non-dedicated resources. A message can be sent that indicates that allocated non-dedicated resource is being allocated as a dedicated resource.

18 Claims, 8 Drawing Sheets

METHOD FOR ALLOCATING NON-DEDICATED RESOURCE AS A DEDICATED RESOURCE

FIELD OF THE INVENTION

The present invention relates generally to the allocation of resources in communication systems and, in particular, to the allocation of non-dedicated random access resources as dedicated random access resources.

BACKGROUND

In wireless communication systems including third generation protocol partnership (3GPP) and long term evolution (LTE) systems, random access resources are available for uplink communication. In general, 64 signatures or resources can be made available in a non-synchronized random access resource. These signatures can always be available per access resource. In addition, multiple random access resources may be defined within one access period in order to provide sufficient number of random access opportunities. Thus, the available number of signatures in a cell at a particular time may be larger than 64.

It has been proposed to allocate some of these signatures within the random access resource to be reserved for dedicated uses. These uses include handover where the dedicated signatures are allocated by a base station or node B to minimize latency and avoid contention. If at the time of handover timing information is not available to the user equipment, it uses the contention-free access using the dedicated signatures and dedicated resources. Dedicated signatures and resources can also be used to maintain or recover uplink synchronization. In this example, the dedicated resources can be used to provide timing information whereby signatures are provided at a specific time. As a result there is no contention in the signature transmission and the node B can identify each user equipment by the timing and signature used.

In another case, dedicated signatures or resources can be used in user detention procedures where users that are interested in upcoming E-MBMS service transmit their response using a common signature. In this case, a dedicated signature is allocated to specific MBMS service and the node B receives an indication whether any user equipment in the cell is interested in this service. In addition, for user equipment that is an idle mode, NACK feedback can be provided using one signature for the feedback. Responses from multiple user equipment can be transmitting using the common dedicated signature. Moreover, rescheduling requests can be transmitted in a contention-free manner by reserving a subset of signature sequences for scheduling request purposes. Thus, each user equipment is assigned a reserved sequence at a specific time to be used as a scheduling request indicator.

As can be seen from the above description, there are multiple uses for dedicated signatures and resources within the random access resource. In addition, each of the uses can vie for the same dedicated resources at the same time. As can be appreciated, the competing uses for the dedicated resource can cause those resources to be blocked for some users. Therefore there is a need to overcome blocking of the dedicated resources to users that may be blocked. In addition, there is a need to keep the complexity of allocated resources and signatures within the random access resource low. This is to be balanced with the need to provide fast responses for requested resources. As is evident, it has been proposed to have dedicated signatures for dedicated uses. This, however, reduces the availability of these dedicated signatures for other purposes. In sum, there is a need for allocation of dedicated and non-dedicated signatures and resources at the highest utilization possible to reduce blocking.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
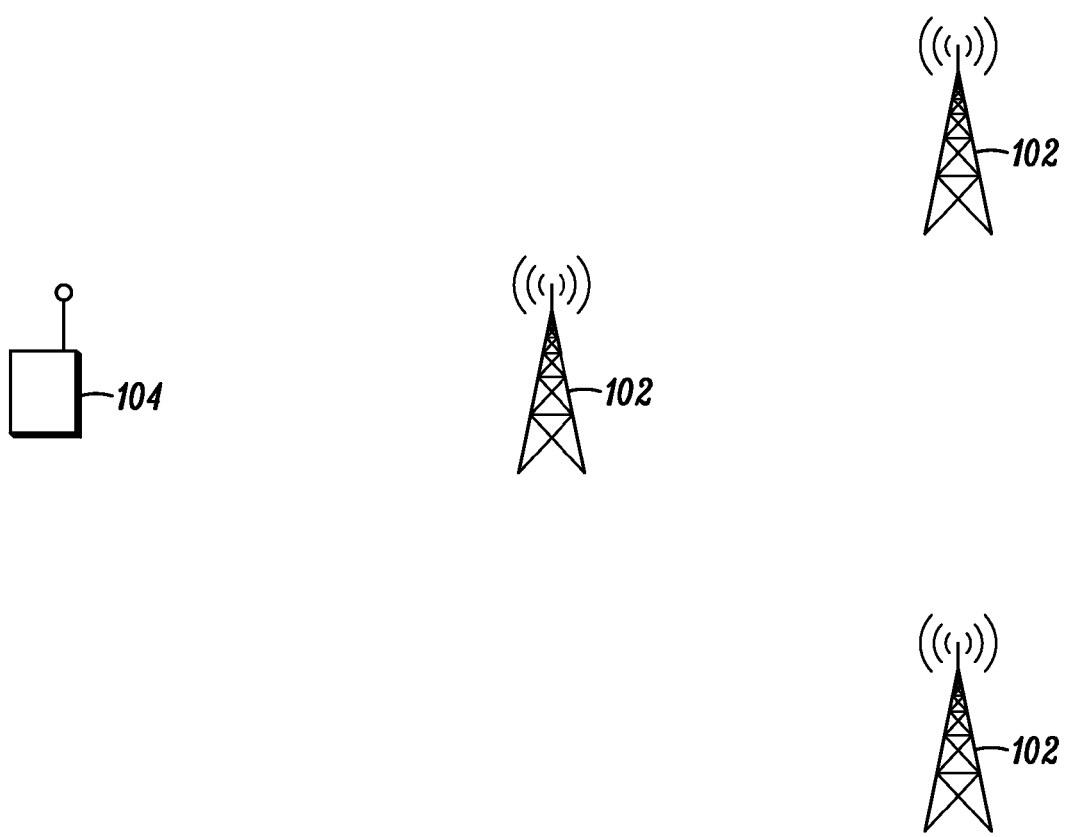
FIG. 1 is an example a communication system that uses the principles of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method of allocating non-dedicated random access resources as random access resources. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of allocating non-dedicated random access resources as dedicated random access resources described herein. The non-processor circuits may include, but are not limited to, a radio receiver, a radio transmitter, signal drivers, clock circuits, power source circuits, and user input devices. As such, these functions may be interpreted as steps of a method to perform the method of allocating non-dedicated random access resources as dedicated random access resources. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The principles described in more detail below apply to a method of allocating resources and signatures of a random access resource (RACH) that includes dedicated and non-dedicated resources. The dedicated and non-dedicated resources can be associated with channels and sub-channels within the RACH. In an embodiment, the method includes a network device such as a base station or node B communicating with user equipment and determining that a dedicated resource from among the plurality of dedicated and non-dedicated resources of the RACH is required for a specific purpose, e.g. handover. The network device determines if the dedicated resource is available for allocation. If the dedicated resource is available, the network device allocates the dedicated resource. If the dedicated resource is not available, however, the network device allocates one of the non-dedicated resources. In an embodiment, a message can be sent that indicates that allocated non-dedicated resource is being allocated as a resource. When the non-dedicated resource allocated as a dedicated resource is no longer being used as a dedicated resource, that non-dedicated resource is returned to the set of non-dedicated resources and can be reallocated as a non-dedicated resource or dedicated resource. In an embodiment, the method includes determining if activity can be found on the non-dedicated resource allocated as a dedicated resource.

In another embodiment of the invention, user equipment may require that a network device such as a base station or node B to provide a dedicated resource for certain uses such as may be needed for handover and the like. When a dedicated resource is available, the user equipment receives an assignment of a dedicated resource for desired purpose. If the dedicated resource is unavailable, the user equipment receive an assignment of a non-dedicated resource that is to be used as the requested dedicated resource. With the assigned non-dedicated resource, the user equipment sends the message intended for the dedicated resource on the assigned non-dedicated resource. If the non-dedicated resource is being used as a dedicated resource, user equipment can receive an identifier to indicate that the non-dedicated resource being used for designated purposes. The identifier also indicates that the non-dedicated resource is not available as a non-dedicated resource because it is being used as a dedicated resource. When the identifier is received, the user equipment can calculate the next transmit opportunity to request a non-dedicated resource.

Turning to FIG. 1, a wireless communication network 100 is shown. Network 100 can be of any type of wireless communication network such as a code division multiple access network (CDMA), global services for mobile communications network (GSM) orthogonal frequency division multiplexing network (OFDM) network and can include a 3GPP, 3GGP2 or LTE network. Such a network 100 uses various network devices and includes node Bs or base stations 102 that communicate with user equipment or mobile station 104. Network 100 includes other network equipment (not shown) such as controllers and agents that have designated roles to effectuate communications through the network.

Figure 2:
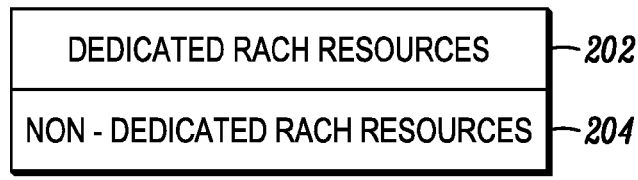
FIG. 2 is a diagram of a random access resource.

For networks such as 3GPP, 3GPP2 and LTE, node Bs 102 and user equipment 104 use resources, such as random access resources (RACH), to send overhead and data messages. As shown in FIG. 2, A RACH 200 can be divided up into a variety of different regions. As used in accordance with the principles described, a RACH includes a first region of dedicated resources 202 and a second region of non-dedicated resources 204. In an embodiment, the dedicated resources can be associated with a set of signatures and the non-dedicated resources can be associated with another set of signatures. In addition, the dedicated and non-dedicated resources can be associated with designated subset of channels within the RACH. The purpose of the dedicated resources 202 is to handle certain types of communications such as handover requests and the like. Dedicated resources 202 are used to provide priority to those messages using the RACH and with the purpose of reducing the complexity for allocating resources for different purposes. Non-dedicated resource 204 are used to other purposes can be allocated for any purpose.

The dedicated resources 202 can be any portion of the total number of 64 signatures for resources within the RACH 200. The dedicated resources 202 are kept proportionally lower than the number of non-dedicated resources 204 so that too much of the resource is not reserved for the specific purposes that use the dedicated resources 202. Nonetheless and as described, various user equipment 104 can be vying for the limited number of dedicated resources 202 blocking of the resources can occur. If all dedicated resources 202 are assigned for various purposes, user equipment 104 needed to effectuate a handover, for example, may not be able to get the resources required to efficiently complete the handover and is therefore blocked from using the dedicated resources. For example, the user equipment 104 may have to delay handover until a designated resource 202 is released by another user equipment.

Figure 3:
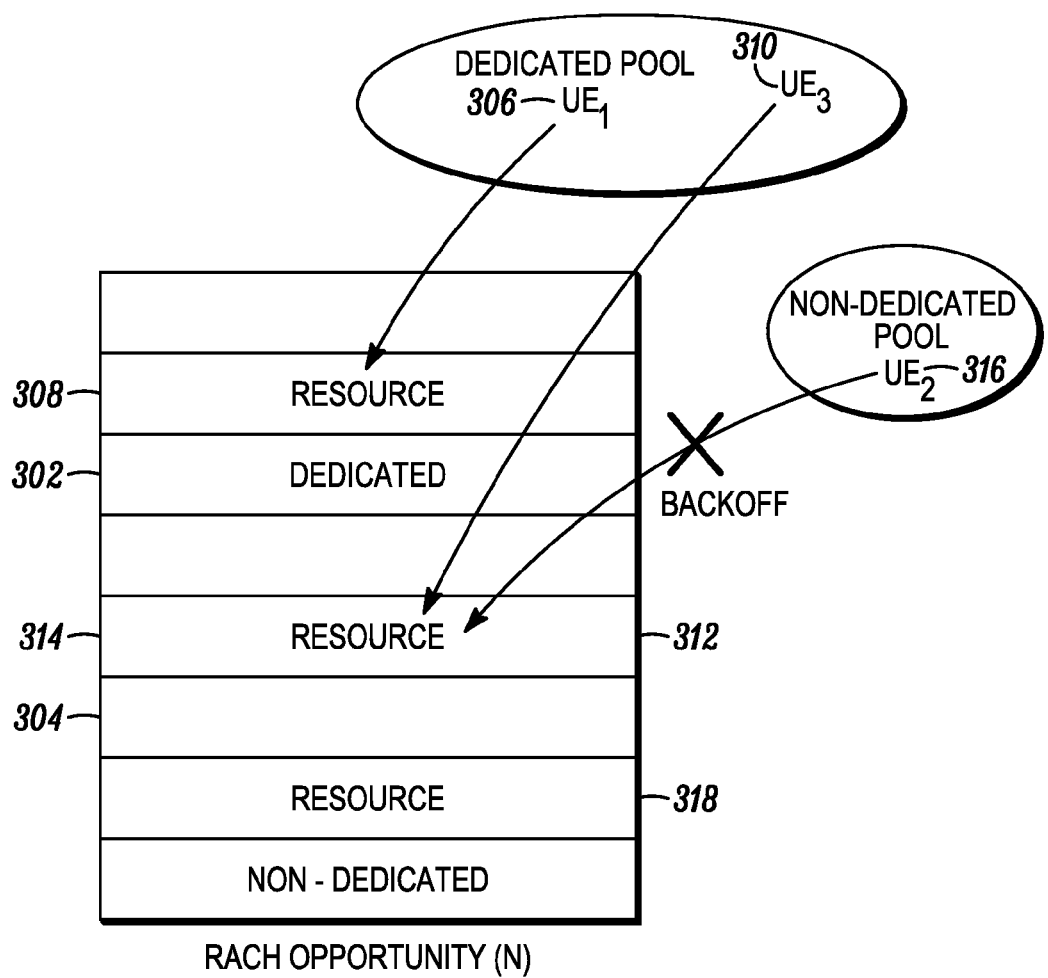
FIG. 3 is a diagram of a random access resource using the principles of the present invention.

Turning to FIG. 3, RACH 300 includes a dedicated resources 302 and non-dedicated resources 304. As shown, user equipment 306 is assigned or allocated a dedicated resource 308. User equipment 310 is assigned or allocated non-dedicated resource 312 as a dedicated resource 314. In an embodiment, this assignment occurs when dedicated resources are blocked for user equipment 310 and the node B cannot allocate such a resource. Thus, the node B allocates the non-dedicated resource 312 to be used as a dedicated resource. In the event that another user equipment 316 requests the non-dedicated resource 312, the user equipment may be provided with an identifier, described in more detail below, that indicates that non-dedicated resource 312 is being used as dedicated resource 314. Thus, user equipment backs off its request for non-dedicated resource 312 and requests another non-dedicated resource 318 and is allocated that resource.

Figure 4:
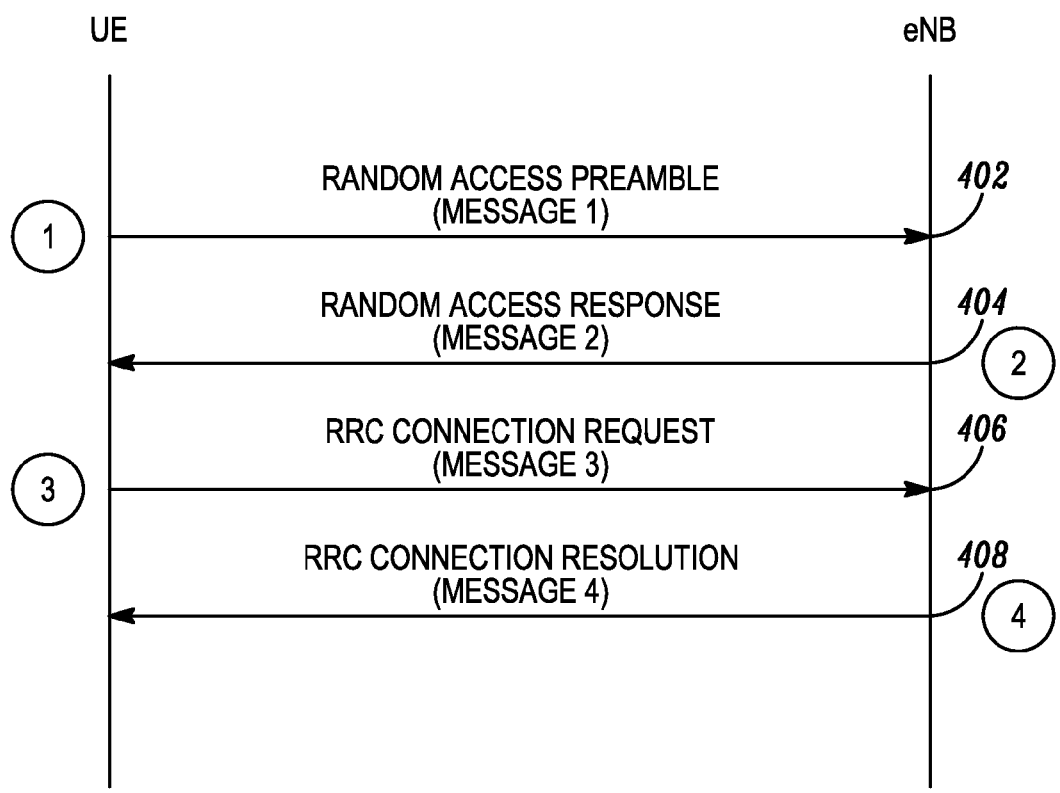
FIG. 4 is a call flow diagram of user equipment and a node B operating using the principles of the present invention.

For the allocation of dedicated and non-dedicated resources, a series of messages can be sent and received between the user equipment and the node B as a part of the random access procedure. FIG. 4 illustrates a call flow diagram of one of these embodiments. The user equipment sends 402 a first message to the node B where the first message that includes a random access preamble. The preamble can contain data regarding the type of data being sent by the user equipment and can be used by the node B to determine they size of resources that was used by the user equipment. In response, the node B sends 404 a random access response to the user equipment that indicates if the dedicated or non-dedicated resource that was used by the user equipment. With this data, the user equipment can send subsequently 406 to the node B for example an RRC connection request, or other message, which are dedicated resources. The node B responds 408 with a RRC contention resolution.

Figure 5:
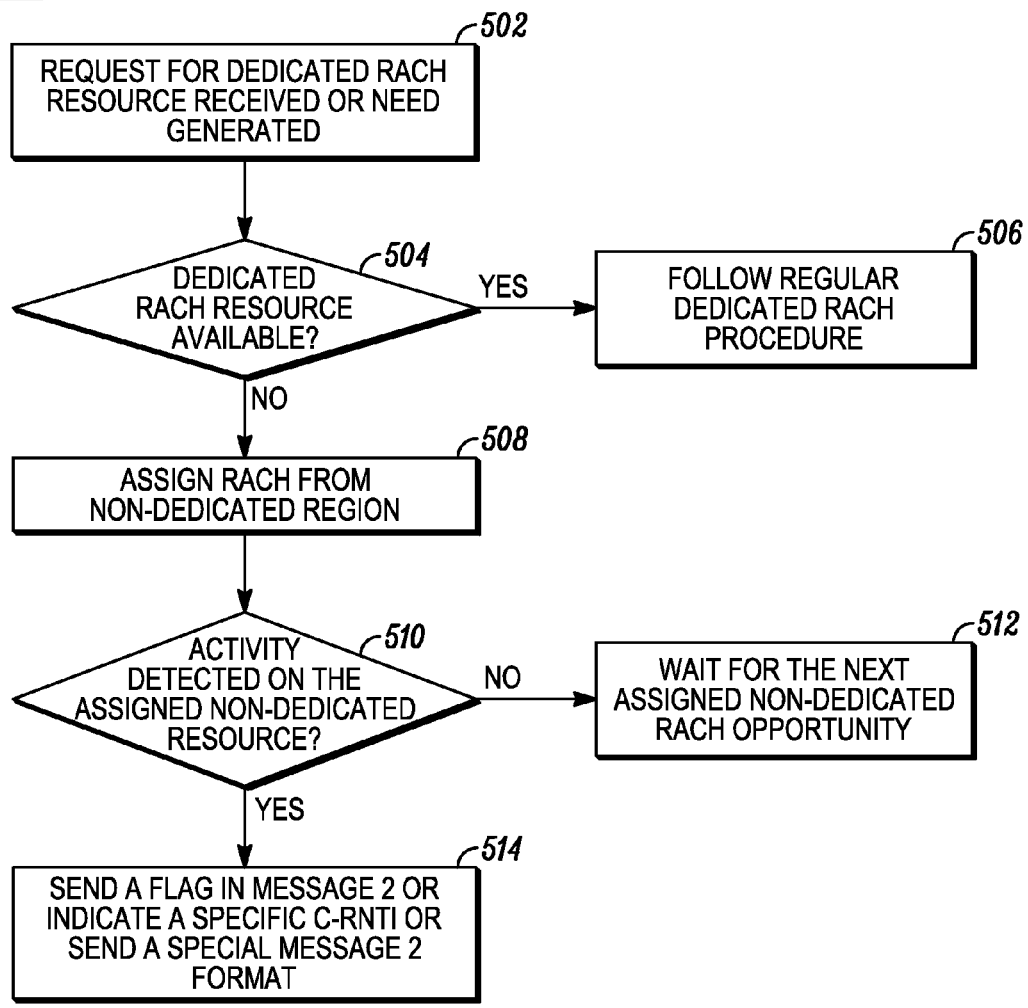
FIG. 5 is a flow chart of a node B or base station operating in accordance with the principles of the present invention.

FIG. 5 is a flow chart of an embodiment that allocates a non-dedicated resource as a dedicated resource when a dedicated resource in a RACH is blocked. As shown, the process 500 begins with a node B, base station or network device 102 that performs similar functions determines 502 that user equipment 104 requires the use of a dedicated resource in the RACH. The node B determines 504 if the requested dedicated resource is available. When the dedicated resource is available, the node B allocates 506 that dedicated resource to the user equipment 104. On the other hand, the node B allocates 508 a non-dedicated resource to the user equipment in lieu of the dedicated resource. In this way, the user equipment is provided a resource in which to perform the desired function instead of having to wait for the requested dedicated resource to become available or having to wait for another opportunity to request a resource.

In addition, the process 500 includes the node B detecting 510 if there is activity on the assigned non-dedicated RACH resource. This step is performed for the node B to determine whether this non-dedicated resource is being used so as to be allocated as a dedicated resource. If it remains in use, the node B will not allocate the resource for other purposes and can prevent other user equipment for using the resource as a dedicated or non-dedicated resource. When no activity is detected on the non-dedicated resource, the node B can assign 512 the non-dedicated resource for any purpose at the next opportunity for such assignments. In an embodiment, the node B calculates the next opportunity. When there is activity detected on the non-dedicated resource, the node B sends 514 an identifier, which can operate as a flag, in a message to indicated that the non-dedicated resource is operating as a dedicated resource or the node B can send a message in a specified format. In an embodiment, the node B sends a message to indicate a specific cell radio network temporary identifier (C-RNTI) for the user equipment.

Figure 6:
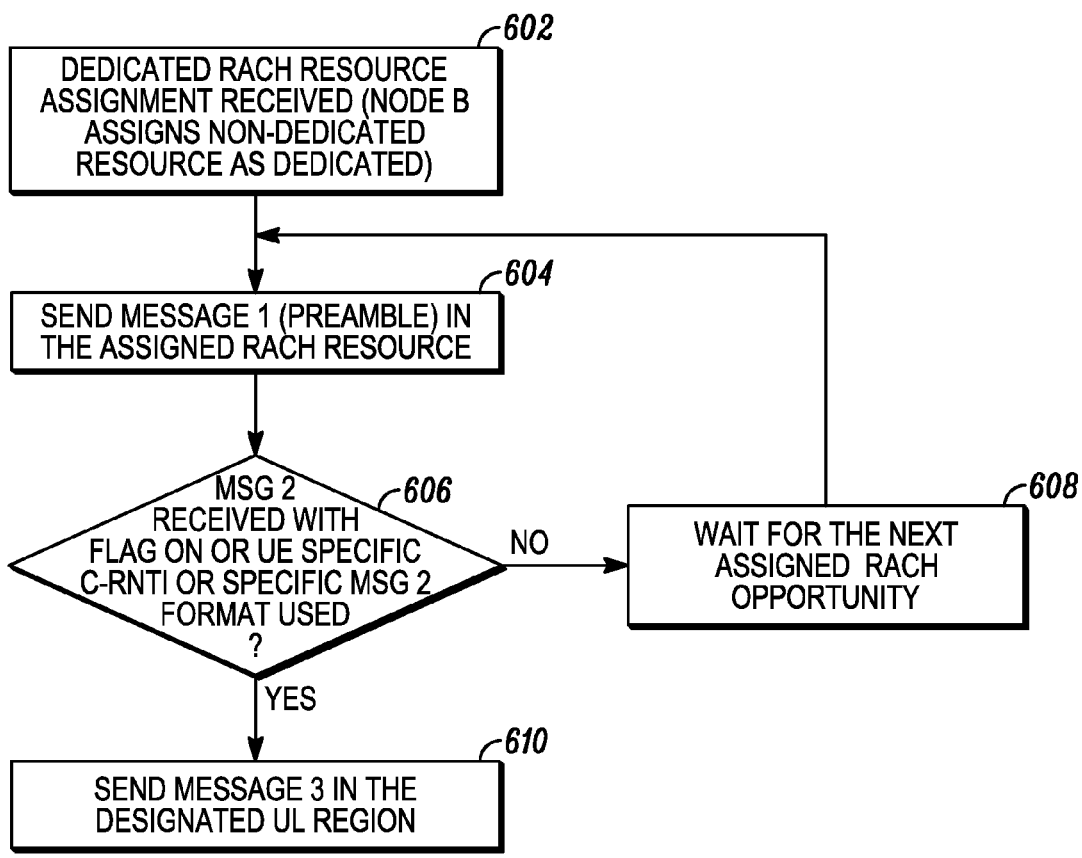
FIG. 6 is a flow chart of user equipment operating in accordance with the principles of the present invention.

FIG. 6 is a flow chart of an embodiment where a non-dedicated resource is received by the user equipment 104 from the node B 102. The process 600 begins with the user equipment receiving 602 a non-dedicated resource for use during a specific purpose such as a handover or the like. In a message to the node B, the user equipment sends 604 a message is associated with the assigned non-dedicated resource. In an embodiment, the message sent can be a part of the random access preamble 402. In response, the user equipment receives a message 404 from the node B. The user equipment must determine 606 if the message includes an identifier on a non-dedicated resource that indicates the non-dedicated resource is being used as the dedicated resource. In an embodiment, the identifier is a C-RNTI indicating the purpose use of the non-dedicated resource. Alternatively, the message has a specific format. When the identifier is not received, the user equipment can be assigned 608 a non-dedicated resource at the next assignment opportunity. In an embodiment, the next opportunity to send on resource is calculated. When the identifier is received, the user equipment can send 610 a message that was intended to be sent on the dedicated resource on the allocated non-dedicated resource. In an embodiment, the message sent is an RRC contention request 406, and the user equipment then receives an RRC contention resolution message 408 from the node B.

Figure 7:
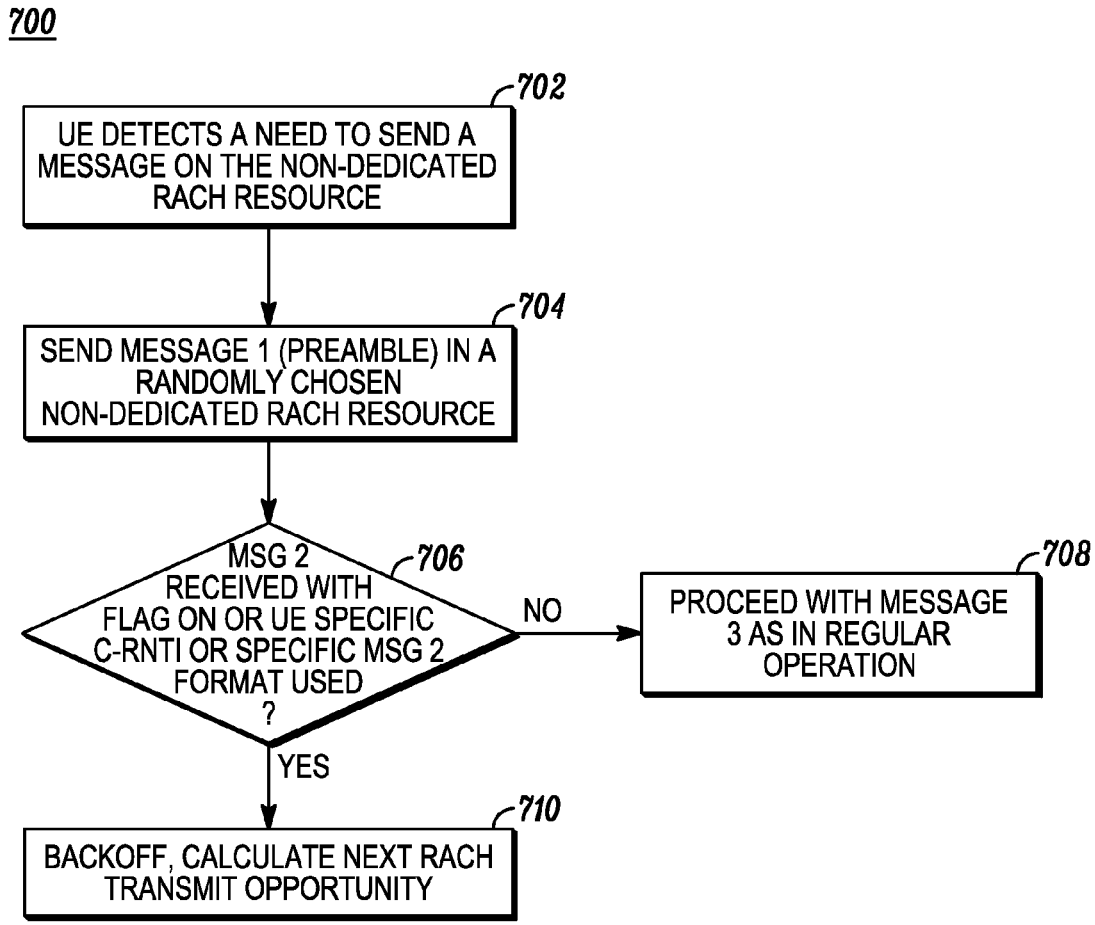
FIG. 7 is a flow chart of user equipment operating in accordance with the principles of the present invention.

FIG. 7 illustrates a flow chart of a process 700 of user equipment that requests attempts to use non-dedicated resources that have been assigned as dedicated resources as described above. The process begins with the user equipment detecting 702 a need to send a message on a non-dedicated resource. Therefore, the user equipment sends 704 the message on a randomly selected non-dedicated resource in the RACH. In an embodiment, such a message is a random access preamble message 402. In response to that message, the user equipment receives 706 a message that may include an identifier in the message or have a specific format. The message an be a random access response message 404 or have a format of such a message. As described, the identifier can be a designated C-RNTI. If the identifier is not received in the message, the user equipment continues to use 708 the non-dedicated resource as the user equipment intended. On the other hand, the user equipment delays 710 using the non-dedicated resource and can request another resource when it detects the identifier. In an embodiment, the user equipment calculates the delay and the next opportunity. The identifier indicates to this user equipment that the non-dedicated resource is being used as a dedicated resource. The user equipment can continue to use the assigned non-dedicated resource for the duration of the desired purpose, e.g. handover. Upon conclusion the non-dedicated resource is released and it can be used for other purposes.

Figure 8:
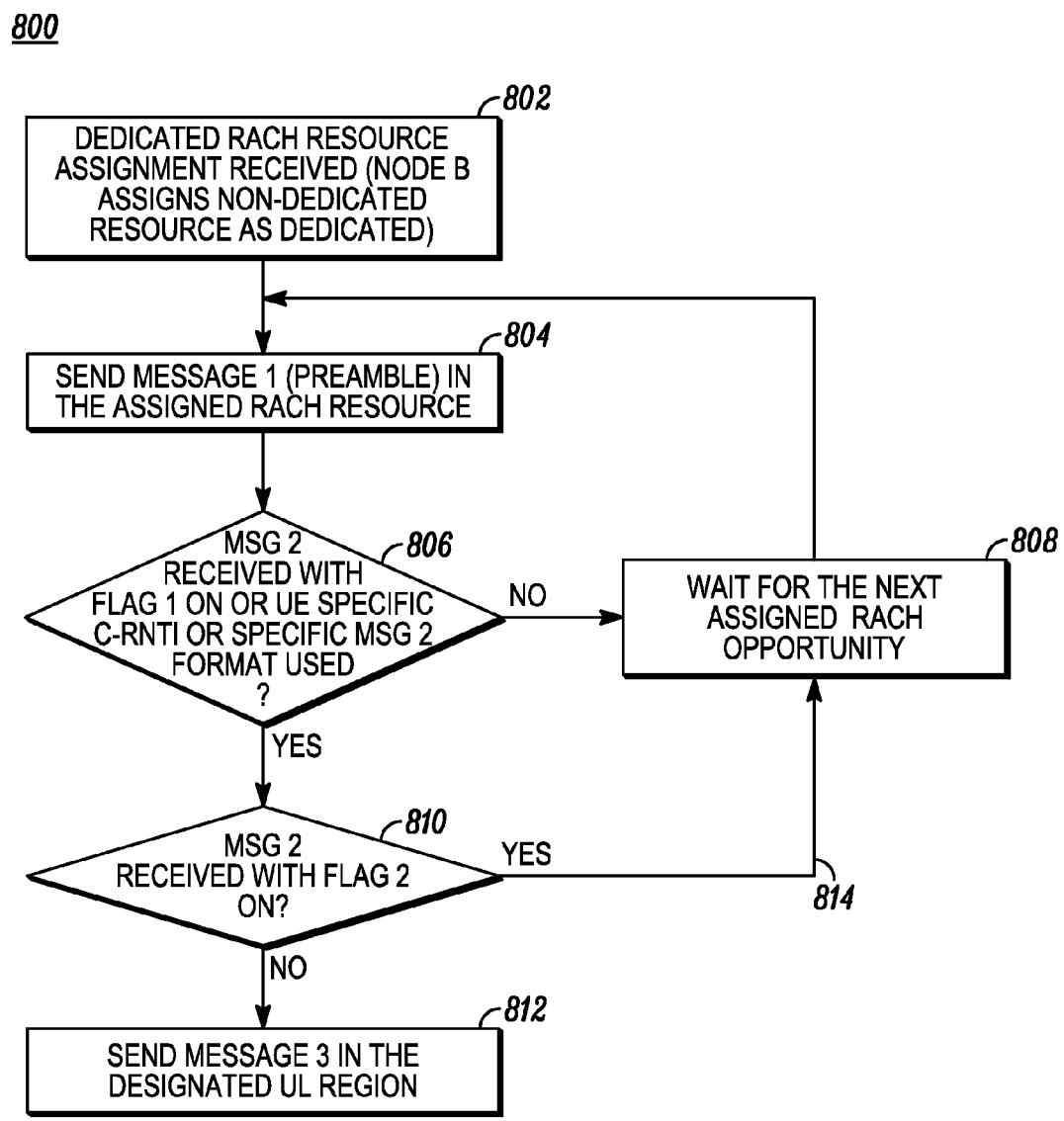
FIG. 8 is a flow chart of user equipment operating in accordance with the principles of the present invention.

Another embodiment to FIG. 7 is shown in FIG. 8 in which the user equipment is asked to reattempt to obtain resources because the node B suspects contention for non-dedicated resources. In this case, timing between the user equipment an the node B can be off. FIG. 8 illustrates a flow chart of a process 800 of user equipment that requests attempts to use non-dedicated resources that have been assigned as dedicated resources as described above. The process begins with the user equipment detecting 802 a need to send a message on a non-dedicated resource. Therefore, the user equipment sends 804 the message on a randomly selected non-dedicated resource in the RACH. In an embodiment, such a message is a random access preamble message 402. In response to that message, the user equipment receives 806 a message that may include an identifier in the message or have a specific format. The message can be a random access response message 404 or have a format of such a message. As described, the identifier can be a designated C-RNTI. If the identifier is not received in the message, the user equipment continues to use 808 the non-dedicated resource as the user equipment intended. On the other hand, user equipment determines 810 if a second identifier is a part of the random access message. If the second flag is present, the non-dedicated resource is used 812 for the purposes that would be used as a dedicated resource. Otherwise, the user equipment waits 814 for the next opportunity for an assignment of a RACH resource.

Figure 9:
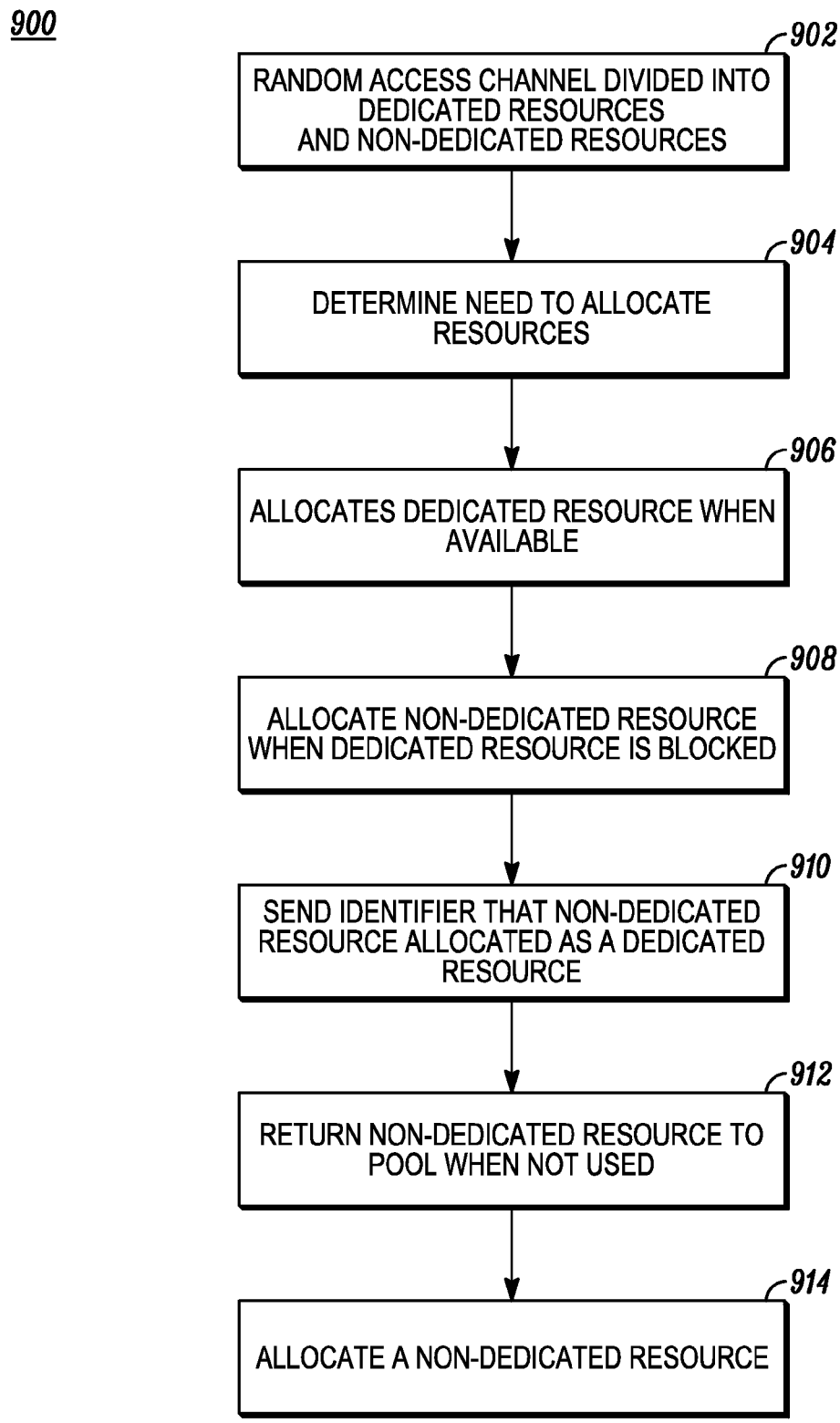
FIG. 9 is a flow chart of the operation of devices in accordance with the principles of the present invention.

Turning to FIG. 9, a flow chart is illustrated of another embodiment of the described process in which a non-dedicated resource is allocated for purposes that otherwise would use a dedicated resource. The process begins with a random access resource being divided 902 into a set of dedicated resources and a set of non-dedicated resources. The dedicated and non-dedicated resources are for use by user equipment 104 within a network where the dedicated resources are intended for use in specific purposes. The network device, such as a node B, determines 904 that it needs to allocate or assign a resources to user equipment or receives a message on a non-dedicated resource. The node B allocates 906 a dedicated resource to the user equipment when the dedicated resource is available. The node B can also respond by allocating 908 one of the set of non-dedicated resources to the user equipment when the requested dedicated resources are blocked and therefore not available. In addition to allocating the non-dedicated resource, the node B sends 910 an identifier that the non-dedicated resource is allocated as a dedicated resource. This identifier can be used by user equipment to understand that the non-dedicated resource is being used as dedicated resource or by other user equipment to understand that the non-dedicated resource is being used by other user equipment as dedicated resource. If this is the case the other user equipment delays using the non-dedicated resource and requests another non-dedicated resource at the next opportunity. When the non-dedicated resource is no longer being used for the dedicated purposes, the non-dedicated resource is returned 912 to the pool of resources that can be requested by user equipment and allocated by a node B. If the user equipment requests a non-dedicated resource, the node B responds by allocating 914 a non-dedicated resource to the user equipment.

The methods describe permit increased versatility based on the partition of a random access resource into dedicated and non-dedicated portions or resources. As described, non-dedicated resources can be used for both dedicated and non-dedicated purposes and particularly in the case when there dedicated resources are blocked. By using non-dedicated resources as a dedicated resource, the dedicated resources available to user equipment operating in a network are increased. Although collisions can occur for non-dedicated resources, messages are used to notify user equipment contending for non-dedicated resources to use other non-dedicated resources. Thus, delay-critical RACH attempts have access to all resources during contention while allowing non-dedicated resources to be used as dedicated resources for limited periods of time without degrading performance costs. At the same time, the method permits RACH to be run at a higher utilization.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
   determining if a dedicated resource of a random access channel used in communications between network equipment and a first user equipment is available for allocation;
   allocating the dedicated resource for the first user equipment when the dedicated resource is available;
   allocating a non-dedicated resource of the random access channel used in the communications between network equipment and the first user equipment when the dedicated resource is blocked, and
   sending a message indicating that the allocated non-dedicated resource is allocated as a dedicated resource when the allocated non-dedicated resources is requested as a non-dedicated resource by a second user equipment.

2. The method of claim 1 further comprising sending a message indicating that the allocated non-dedicated resource is allocated as a dedicated resource.

3. The method of claim 1 further comprising determining if activity is associated with the non-dedicated resource allocated as a dedicated resource.

4. The method of claim 3 further comprising sending a message when it is determined that activity is associated with the non-dedicated resource allocated as a dedicated resource.

5. The method of claim 4 further comprising sending an identifier when it is determined that activity is associated with the non-dedicated channel allocated as a dedicated channel.

6. The method of claim 1 further comprising allocating another non-dedicated resource when it is determined that the non-dedicated resource is allocated as the dedicated resources.

7. The method of claim 1 further comprising reallocating the non-dedicated resource allocated as a dedicated resource as a non-dedicated resource.

8. A method comprising:
   receiving an assignment for a dedicated resource of a random access channel used in communications between network equipment and a first user equipment when the dedicated resource is available
   receiving an assignment for non-dedicated resource of a random access channel used in communications between network equipment and the first user equipment when the dedicated resource is blocked;
   sending a message on one of the assigned dedicated resource and non-dedicated when the dedicated resource is blocked;
   receiving a message indicating that a requested non-dedicated resource is allocated as a dedicated resource by a second user equipment.

9. The method of claim 8 further comprising receiving an identifier indicating that assigned non-dedicated resource is used as a dedicated resource.

10. The method of claim 9 further comprising sending a second message wherein the sending a second message is being associated with the message associated with the non-dedicated resource allocated as a dedicated resource.

11. The method of claim 9 further comprising calculating transmit opportunity to transmit on the assigned non-dedicated resource as dedicated resource when the identifier is not received.

12. The method of claim 11 further comprising sending a second message associated with the sending of the message on non-dedicated resource allocated as a dedicated resource when the identifier is received.

13. The method of claim 8 further comprising:
   selecting a non-dedicated resource;

transmitting on the selected non-dedicated resource, when one of a dedicated resource and a non-dedicated resource allocated as dedicated is not assigned;

determining if an identifier is received in response to the sending on a selected non-dedicated resource to determine if it is used as a dedicated resource, and calculating transmit opportunity to select and transmit on another non-dedicated resource when the identifier is received.

14. The method of claim 13 further comprising sending message associated with the transmission of the message on the non-dedicated resource when the identifier is not received.

15. The method of claim 8 wherein the random access channel includes a first region associated with the dedicated resource and a second region associated the non-dedicated resource.

16. The method of claim 9 further comprising:

determining a second identifier is received;

sending a message when the second identifier is not received, and waiting for another opportunity to transmit on one of the assigned dedicated resource and the non-dedicated resources allocated as a dedicated resource.

17. The method of claim 16 further comprising sending a message associated with the transmission of the message on one of the assigned dedicated resource and the assigned non-dedicated resource allocated as dedicated resource.

18. A method comprising:

dividing a resource into a set of dedicated resources and a set of non-dedicated resources wherein the dedicated and non-dedicated resources are a part of a random access channel used in communications between network equipment and a first user equipment;

allocating one of the set of dedicated resources to one of the network equipment and the first user equipment when the dedicated resource is available;

allocating one of the set of non-dedicated sub-resources to one of the network equipment and the first user equipment requesting a non-dedicated sub-resource;

allocating one of the set of non-dedicated sub-resources to one of the network equipment and user equipment as the set of dedicated resources when the dedicated resources are blocked, and sending a message indicating that the allocated one of the set of non-dedicated sub-resources is allocated as the set of dedicated resources when the non-dedicated resources is requested as a non-dedicated resource by a second user equipment.

\* \* \* \* \*

UNITED STATES PATENT AND TRADEMARK OFFICE
CERTIFICATE OF CORRECTION

PATENT NO. : 8,867,454 B2
APPLICATION NO. : 12/052641
DATED : October 21, 2014
INVENTOR(S) : Ivan N. Vukovic et al.

Page 1 of 1

It is certified that error appears in the above-identified patent and that said Letters Patent is hereby corrected as shown below:

In The Claims

Claim 8, Column 8, line 40, please replace "dedicated resource is available" with -- dedicated resource is available; --.

Claim 18, Column 10, line 19, please replace "are blocked, and" with -- are blocked; and --.

Signed and Sealed this
Twenty-third Day of June, 2015

Michelle K. Lee
*Director of the United States Patent and Trademark Office*